(12) United States Patent
Tsai et al.

(10) Patent No.: US 6,597,441 B1
(45) Date of Patent: Jul. 22, 2003

(54) APPARATUS AND METHOD FOR CALIBRATING REFLECTIVE LENS

(75) Inventors: Jenn-Tsair Tsai, Hsinchu (TW); Chieng-Ming Tsaur, Hsinchu (TW)

(73) Assignee: Mustek Systems, Inc., Hsinchu (TW)

( * ) Notice: Subject to any disclaimer, the term of this patent is extended or adjusted under 35 U.S.C. 154(b) by 0 days.

(21) Appl. No.: 09/256,581

(22) Filed: Feb. 24, 1999

(51) Int. Cl.⁷ .................................. G01J 1/00
(52) U.S. Cl. .................................... 356/123
(58) Field of Search .............. 356/123, 124.5, 356/127, 124, 125, 601–624, 629, 138, 388–398, 139, 142–148; 358/504, 406, 515; 702/103, 85, 153, 159; 359/470; 250/205

(56) References Cited
U.S. PATENT DOCUMENTS 5,966,209 A * 10/1999 Cheng et al. ............ 356/124.5

* cited by examiner

Primary Examiner—Tu T. Nguyen
(74) Attorney, Agent, or Firm—Katten Muchin Zavis Rosenman

(57) ABSTRACT

An apparatus and a method adapted to be used in manufacturing an image scanning apparatus for calibrating a reflective lens on a carriage are disclosed. A calibrating device has thereon a first set of three projective points from three point light beams and a first set of three calibrating points corresponding to three point light sources. The calibrating device further includes thereon a second set of three projective points and a second set of three calibrating points for matching each of the projective points on the calibrating device with a corresponding one of the calibrating points by adjusting an angle and a position of the reflective lens on the carriage so as to achieve a calibrating function.

43 Claims, 8 Drawing Sheets

APPARATUS AND METHOD FOR CALIBRATING REFLECTIVE LENS

FIELD OF THE INVENTION

The present invention relates to an apparatus and a method for calibrating a reflective lens, and more particularly to an apparatus and method for calibrating a reflective lens for being used in manufacturing an image scanning apparatus.

BACKGROUND OF THE INVENTION

As one of the peripheral equipment of a personal computer, the image scanner has become quite popular among computer users. The manufacturers of image scanners devoted themselves to improving the shortcoming and function of each component. Among the components of an image scanner, a reflective lens set is used to direct the image light beam of a scanning spot to a mirror set, and to focus on a charge coupled device (CCD) for being sensed. The reflective lens set, the mirror set and the CCD are commonly arranged inside a carriage. Because of the deviation of the lens 11 in a reflective lens set (please refer to FIGS. 1(a) and 1(b) respectively showing the deviation caused by rotational displacements of the lens 11 and FIG. 1(c) showing the deviation caused by a translational displacement of the lens 11), it results in a shift or deflection of the actual scanning line constructed by the reflective light path. The various errors on the scanning lines due to the inappropriate placement of lenses in a reflective lens set are shown in FIGS. 2(a)~2(d).

FIG. 2(a) shows an error in the X-direction (where X-direction is parallel to the direction of the scanning line) due to the inappropriate placement of a lens in a reflective lens set. The error causes a change in the scanning scope (X-direction) which results in a part of a scanned document being beyond the scanning window so that the image of that part can not be obtained. It also results in that the distance between the left end of the scanning line and the CCD is different from the optical distance between the right end of the scanning line and the CCD. It further affects the depth of view and the resolution of a scanning image.

FIG. 2(b) shows an error in the Y-direction (where Y-direction is parallel to the moving direction of the carriage) due to the inappropriate placement of a lens in a reflective lens set. The error causes a shift of the scanning spot in the Y-direction, resulting in a change in its optical distance. Moreover as the scanning spot shifts to the edge of or outside the transparent slot, a chromatic aberration phenomenon will be occurred to affect the scanning process.

FIG. 2(c) shows an error in both X-direction and Y-direction due to the inappropriate placement of a lens in a reflective lens set. The error causes a shift of the scanning spot in the X and Y directions simultaneously resulting in a change in its optical distance and a distortion of the scanning image. The change in the optical distance further affects the depth of view and the resolution of the scanning image. FIG. 2(d) shows an error in the light path due to the inappropriate placement of a lens in a reflective lens set. The deflected scanning line and the original scanning line will intersect at a right scanning position at a certain scanning height h1; however, a change in an optical distance and a chromatic aberration phenomenon may be occurred due to part of the light in the light path being blocked.

The above-mentioned deviation phenomenon is frequently appeared in the step of developing various parts of an image scanner during performing a verification process after mock-up or injection molding. It seriously affects the scanning quality and must be corrected by a calibrating apparatus and method after finding out the deviation factor Taiwanese Patent No. 325554 has disclosed a method for calibrating an assembling reflective lens of the linear scanning device. However, that calibrating method is relatively complicated. As the number of the reflective lenses in a reflective lens set increases, it requires the fabrication tools with higher precision for that calibrating method. Besides, the prior method performs an observation of the calibration at the location of a CCD and results in low accuracy because only a scale-down image is observed at the location of a CCD.

Thus, it is tried by the applicant to deal with the situation encountered with the prior art.

SUMMARY OF THE INVENTION

The object of the present invention is to provide an apparatus and a method for calibrating the various errors of a reflective lens on a carriage for being used in manufacturing an image scanning apparatus.

According to one aspect of the present invention, the apparatus adapted to be used in manufacturing an image scanning apparatus for calibrating a reflective lens on a carriage includes a fixing unit for fixing thereon the carriage, three point light sources located at three lined-up positions respectively, for respectively emitting point light beams to transmit along corresponding one of predetermined light paths of the image scanning apparatus into the carriage and pass out of the carriage from one end thereof, and a calibrating device having thereon at a first distance from the end of the carriage a first set of three projective points from the three point light beams passing out of the end of the carriage and a first set of three calibrating points corresponding to the three point light sources and at a second distance from the end of the carriage a second set of three projective points from the three point light beams passing out of the end of the carriage and a second set of three calibrating points corresponding to the three point light sources for matching each of the projective points on the calibrating device with a corresponding one of the calibrating points by adjusting an angle and a position of the reflective lens on the carriage so as to achieve a calibrating function.

In a preferred embodiment, the three lined-up positions are located over which an image sensing device of the image scanning apparatus is to travel.

In another preferred embodiment, the three lined-up positions are located to which the light paths of the image scanning apparatus are to extend. Preferably, the three point light sources are laser light sources.

Preferably, the calibrating device includes a first calibrating plate located at the first distance from the end of the carriage for obtaining thereon the first set of three projective points and the first set of three calibrating points and a second calibrating plate located at the second distance from the end of the carriage for obtaining thereon the second set of three projective points and the second set of three calibrating points.

Preferably, the first calibrating plate and the second calibrating plate are made of transparent material.

Preferably, the end of the carriage is provided for accommodating an object to be scanned.

In accordance with another aspect of the present invention, the method of calibrating a reflective lens on a carriage for being used in manufacturing an image scanning apparatus includes the steps of (a) fixing the carriage to a certain position, (b) installing three point light sources on three lined-up positions respectively, (c) at a first distance from one end of the carriage defining a first set of three calibrating points with respect to the three point light sources, (d) at a second distance from the end of the carriage, defining a second set of three calibrating points with respect to the three point light sources, (e) causing each of the three point light sources to transmit along corresponding one of predetermined light paths of the image scanning apparatus into the carriage and passing out from the end of the carriage so as to obtain a first set of three projective points and a second set of three projective points, and (f) adjusting an angle and a position of the reflective lens on the carriage for matching each of the projective points with a corresponding one of the calibrating points so as to achieve a calibrating function.

In a preferred embodiment, the first set of three projective points and the first set of three calibrating points are disposed on a first calibrating plate located at a first distance from the end of the carriage.

In another preferred embodiment, the second set of three projective points and the second set of three calibrating points are disposed on a second calibrating plate located at a second distance from the end of the carriage.

In accordance with another aspect of the present invention, the apparatus adapted to be used in manufacturing an image scanning apparatus for calibrating a reflective lens on a carriage includes a fixing unit for fixing thereon the carriage, a movable point light source located at three lined-up positions alternately, for alternately emitting a point light beam from each of the three lined-up positions to transmit along corresponding one of predetermined light paths of the image scanning apparatus into the carriage and pass out of the carriage from one end thereof, a first calibrating piece located at a first distance from the end of the carriage for obtaining thereon a first set of three projective points from the three point light beams passing out of the end of the carriage and having thereon a first set of three calibrating points corresponding to the three light beams from the three lined-up positions, and a second calibrating piece located at a second distance from the end of the carriage for obtaining thereon a second set of three projective points from the three point light beams passing out of the end of the carriage and having thereon a second set of three calibrating points corresponding to the three point light beams from the three lined-up positions for matching each of the projective points on the calibrating pieces with a corresponding one of the calibrating points by adjusting an angle and a position of the reflective lens on the carriage so as to achieve a calibrating function.

In a preferred embodiment, the point light source is a laser light source.

In another preferred embodiment, both calibrating pieces are in a form of plate and are made of transparent material.

In accordance with another aspect of the present invention, the method of calibrating a reflective lens on a carriage for being used in manufacturing an image scanning apparatus includes the steps of (a) fixing the carriage to a certain position, (b) installing a movable point light source on each of three lined-up positions alternately, for alternately emitting three point light beams from the three lined-up positions, (c) at a first distance from one end of the carriage, defining a first set of three calibrating points with respect to the three point light beams from the three lined-up positions, (d) at a second distance from the end of the carriage, defining a second set of three calibrating points with respect to the three point light beams from the three lined-up positions, (e) causing each of the point light beams to transmit along corresponding one of predetermined light paths of the image scanning apparatus into the carriage and pass out from the end of the carriage so as to obtain a first set of three projective points and a second set of three projective points, and (f) adjusting an angle and a position of the reflective lens on the carriage for matching each of the projective points with a corresponding one of the calibrating points so as to achieve a calibrating function.

In accordance with another aspect of the present invention, the apparatus adapted to be used in manufacturing an image scanning apparatus for calibrating a reflective lens on a carriage includes a fixing unit for fixing thereon the carriage, a point light source located at a position for emitting point light beam to transmit along a predetermined light path of the image scanning apparatus into the carriage and pass out of the carriage from one end thereof, and a calibrating device having thereon at a first distance from the end of the carriage a first projective point from the point light beam passing out of the end of the carriage and a first calibrating point corresponding to the point light source, the calibrating device having thereon at a second distance from the end of the carriage a second projective point from the point light beam passing out of the end of the carriage and a second calibrating point corresponding to the point light source for matching each of the projective points on the calibrating device with a corresponding one of the calibrating points by adjusting an angle and a position of the reflective lens on the carriage so as to achieve a calibrating function.

In a preferred embodiment, the calibrating device includes a first calibrating plate located at the first distance from the end of the carriage for obtaining thereon the first projective point from the light beam passing out of the end of the carriage and having thereon the first calibrating point corresponding to the light source, and a second calibrating plate located at the second distance from the end of the carriage for obtaining thereon the second projective point from the light beam passing out of the end of the carriage and having thereon the second calibrating point corresponding to the light source.

In accordance with another aspect of the present invention, the method of calibrating a reflective lens on a carriage for being used in manufacturing an image scanning apparatus includes the steps of (a) fixing the carriage to a certain position, (b) installing a point light source on a specific position, (c) at a first distance from one end of the carriage, defining a first calibrating point with respect to the point light source, (d) at a second distance from the end of the carriage, defining a second calibrating point with respect to the point light source, (e) causing the point light source to transmit along a predetermined light path of the image scanning apparatus into the carriage and pass out from the end of the carriage so as to obtain a first projective point and a second projective point, and (f) adjusting an angle and a position of the reflective lens on the carriage for matching each of the projective points with a corresponding one of the calibrating points so as to achieve a calibrating function.

In a preferred embodiment, the specific position is located over which an image sensing device of the image scanning apparatus is to travel.

In another preferred embodiment, the specific position is located to which the predetermined light path of the image scanning apparatus is to extend.

In accordance with another aspect of the present invention, the apparatus adapted to be used in manufacturing an image scanning apparatus for calibrating a reflective lens on a carriage includes a fixing unit for fixing thereon the carriage, two point light sources located at two specific positions respectively, for respectively emitting point light beams to transmit along corresponding one of predetermined light paths of the image scanning apparatus into the carriage and pass out of the carriage from one end thereof, a first calibrating piece located at a first distance from the end of the carriage for obtaining thereon a first set of two projective points, wherein a third projective point lined up with the first set of two projective points is obtained by operating the first set of two projective points to develop a first set of three projective points and to define a first set of three calibrating points on the first calibrating piece to be compared to the first set of three projective points and a second calibrating piece located at a second distance from the end of the carriage for obtaining thereon a second set of two projective points, wherein another third projective point lined up with the second set of two projective points is obtained by operating the second set of two projective points to develop a second set of three projective points and to define a second set of three calibrating points on the second calibrating piece to be compared to the second set of three projective points for matching each of the projective points on the calibrating pieces with a corresponding one of the calibrating points by adjusting an angle and a position of the reflective lens on the carriage so as to achieve a calibrating function.

In accordance with another aspect of the present invention, the method of calibrating a reflective lens on a carriage for being used in manufacturing an image scanning apparatus includes the steps of (a) fixing thereon the carriage to a certain position, (b) installing two point light sources on two specific positions respectively, (c) causing each of the two point light sources to transmit along corresponding one of predetermined light paths of the image scanning apparatus into the carriage and pass out from the end of the carriage so as to obtain a first set of two projective points at a first distance from one end of the carriage and a second set of two projective points at a second distance from the end of the carriage, (d) obtaining a third projective point lined up with the first set of two projective points by operating the first set of two projective points to develop a first set of three projective points, (e) defining a first set of three calibrating points to be compared to the first set of three projective points, (f) obtaining another third projective point lined up with the second set of two projective points by operating the second set of two projective points to develop a second set of three projective points, (g) defining a second set of three calibrating points to be compared to the second set of three projective points, and (h) adjusting an angle and a position of the reflective lens on the carriage for matching each of the projective points with a corresponding one of the calibrating points so as to achieve a calibrating function.

In a preferred embodiment, the two specific positions are located over which an image sensing device of the image scanning apparatus is to travel.

In another preferred embodiment, the two specific positions are located to which the light paths of the image scanning apparatus are to extend.

Preferably, the end of the carriage is provided for accommodating an object to be scanned.

Preferably, the third projective point of the first set of three projective points is obtained by an extrapolation.

Preferably, the third projective point of the first set of three projective points is obtained by an interpolation.

Preferably, the third projective point of the second set of three projective points is obtained by an extrapolation.

Preferably, the third projective point of the second set of three projective points is obtained by an interpolation.

Preferably, the two point light sources are laser light sources.

The present invention may best be understood through the following description with reference to the accompanying drawings, in which:

DETAILED DESCRIPTION OF THE PREFERRED EMBODIMENTS

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 3:
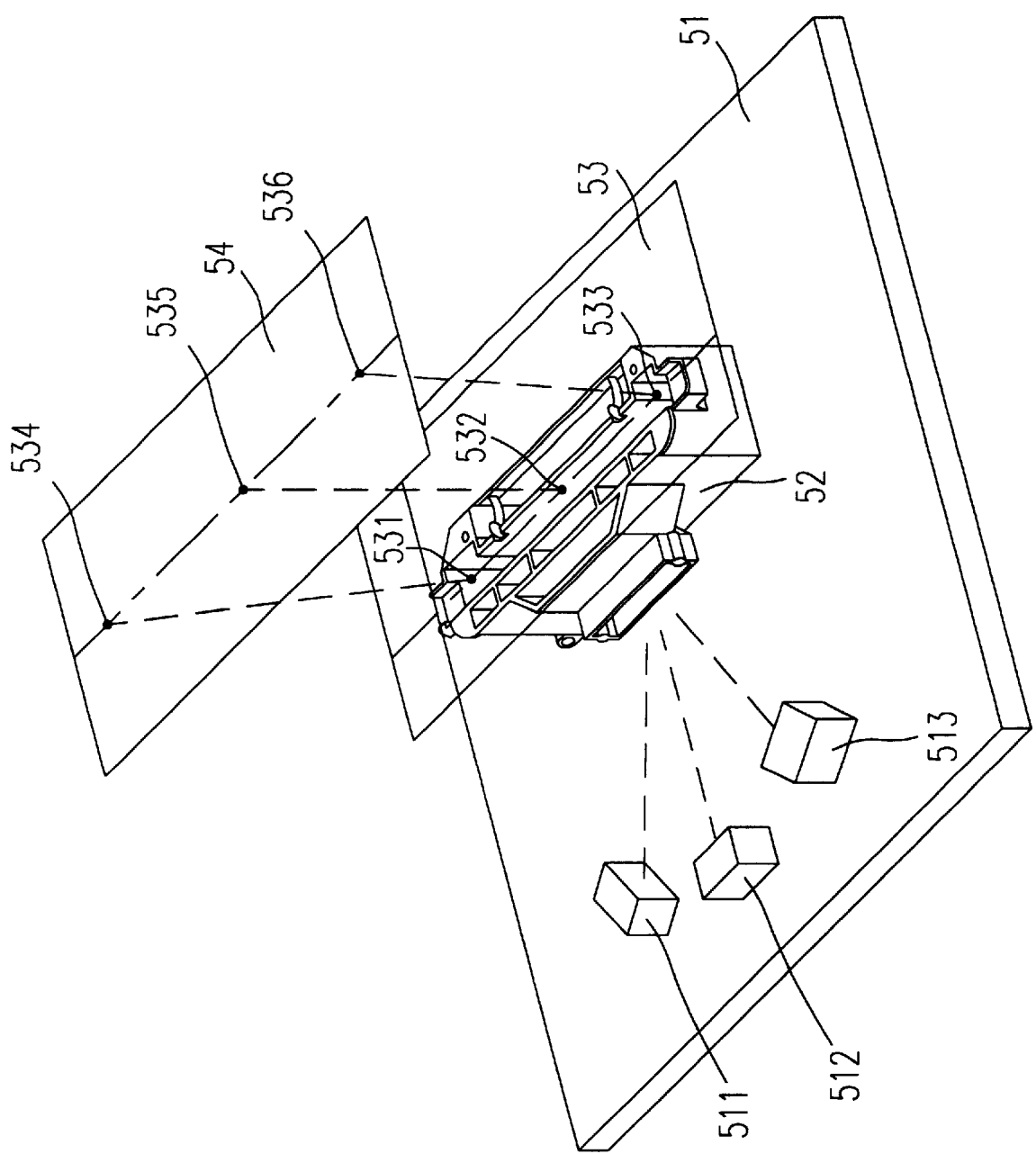
FIG. 3 is a perspective view showing a preferred embodiment of the apparatus according to the present invention.

Please refer to FIG. 3 which is a perspective view showing a preferred embodiment of the apparatus according to the present invention. Three laser light beam emitters 511, 512, 513 are respectively located at three lined up positions, over which an image sensing device of the image scanning apparatus is to travel or to which the light paths of the image scanning apparatus are to extend, for respectively emitting point light beams to transmit along corresponding one of predetermined light paths of the image scanning apparatus into the carriage 52 to be verified, be reflected by the mirror set (not shown) and the reflective lens set (not shown) inside the carriage, pass out of the carriage from one end thereof, and project into the first calibrating plate 53 and the second calibrating plate 54 which are made of transparent material. The first calibrating plate 53 and the second calibrating plate 54 have six predetermined calibrating points 531, 532, 533, 534, 535, 536, respectively.

After fixing the carriage 52 to the fixing unit 51, we start the laser light emitters 511, 512, 513 for transmitting along corresponding one of predetermined light paths of the image scanning apparatus into the carriage 52 and interacting with the mirror set (not shown) and the reflective lens set (not shown) inside the carriage so as to obtain six projective points on the first calibrating plate 53 and the second calibrating plate 54 respectively. By adjusting the angle and position of each reflective lens of the reflective lens set for matching each of the projective points with a corresponding one of the calibrating points 531, 532, 533, 534, 535, 536, the calibrating function for the reflective lens set is achieved.

Figure 1A:
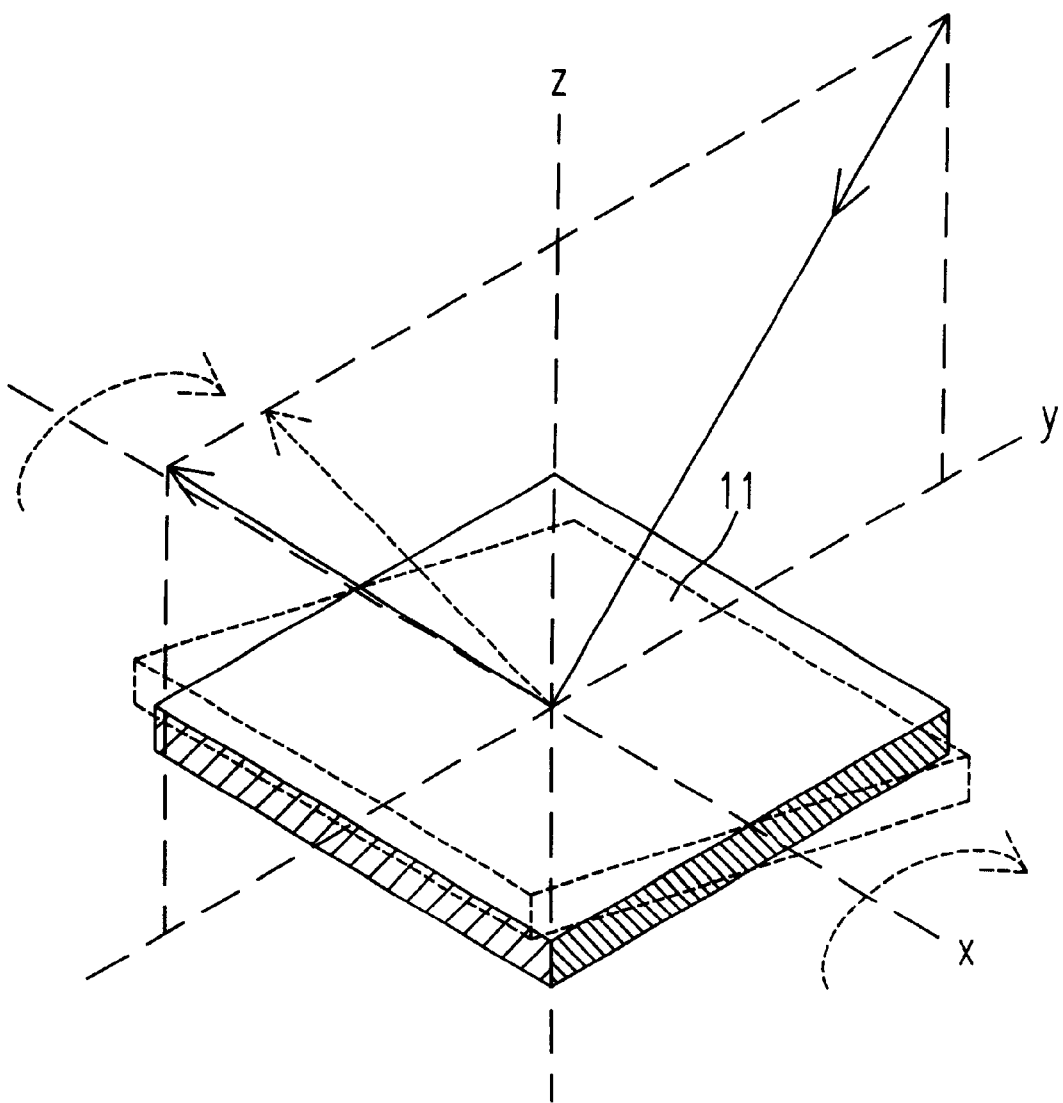
FIG. 1(a) shows the deviation caused by the rotational displacement with respect to the y-axis of a lens in a reflective lens set.
Figure 1B:
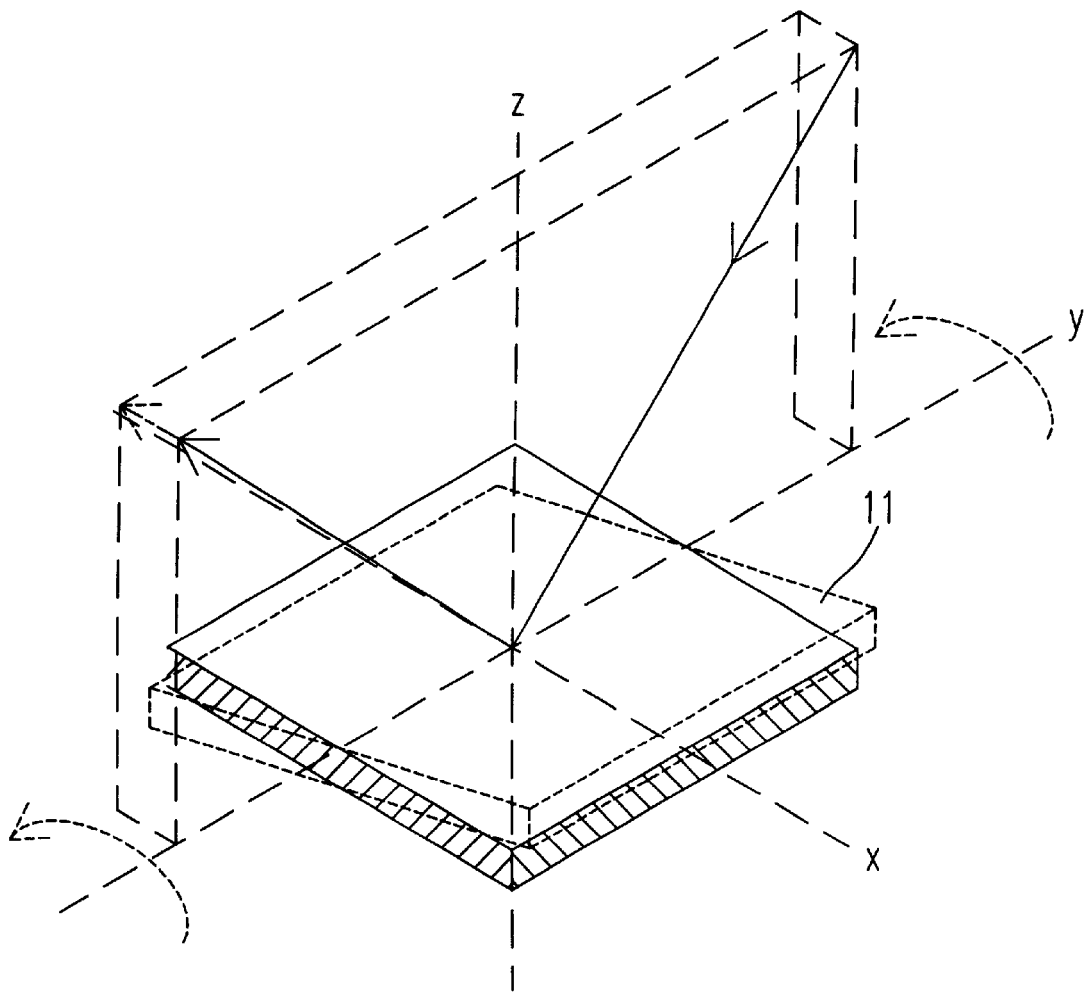
FIG. 1(b) shows the deviation caused by the rotational displacement with respect to the x-axis of a lens in a reflective lens set.
Figure 1C:
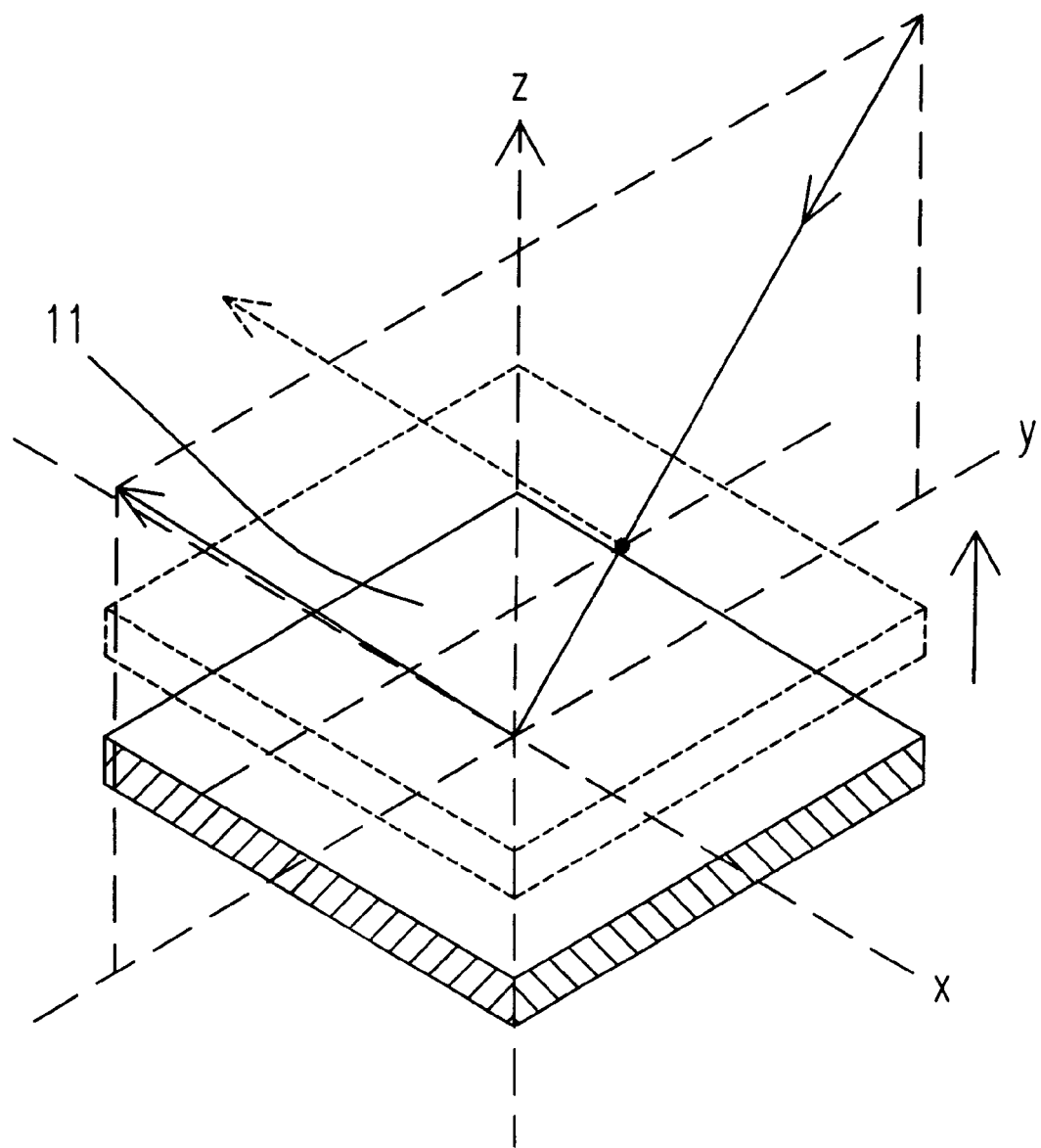
FIG. 1(c) shows the deviation caused by the translational displacement with respect to the z-axis of a lens in a reflective lens set.
Figure 2A:
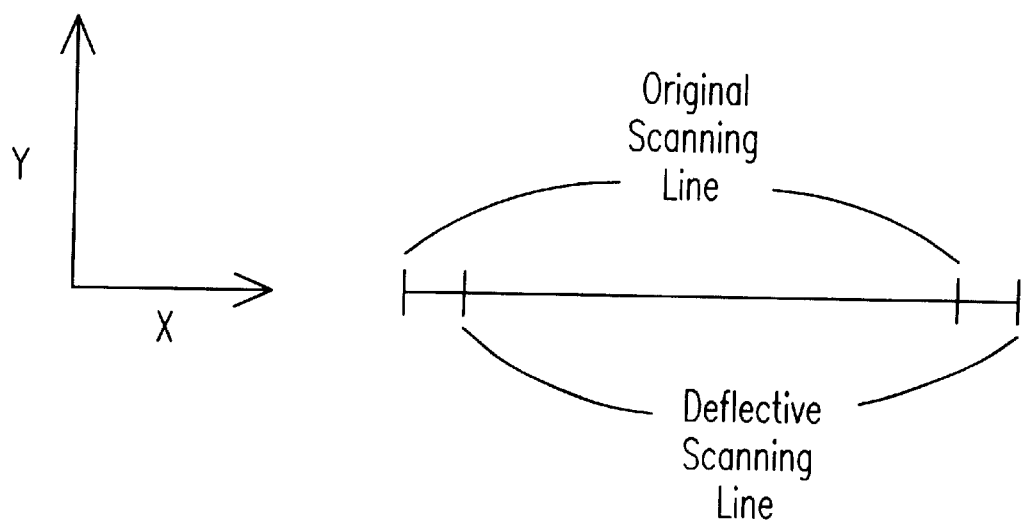
FIGS. 2(a)~2(d) are schematic diagrams respectively showing the various errors of scanning lines due to the inappropriate placement of a lens in a reflective lens set.
Figure 2B:
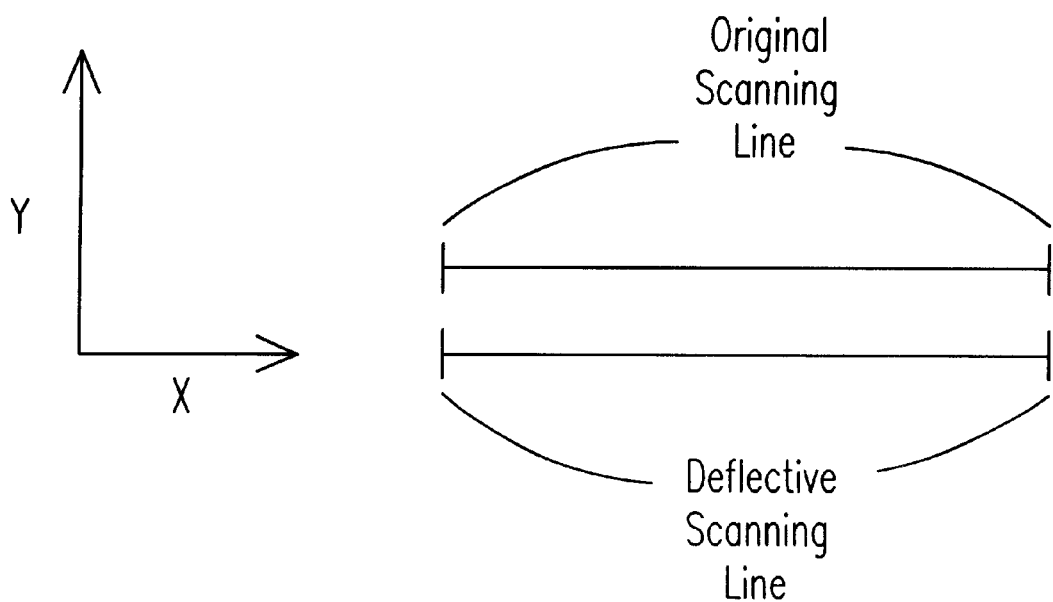
Figure 2C:
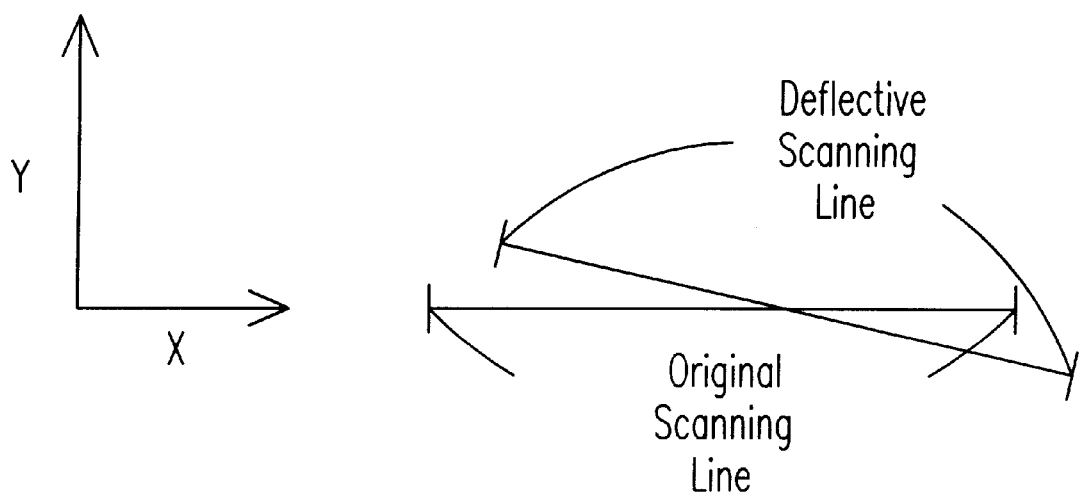
Figure 2D:
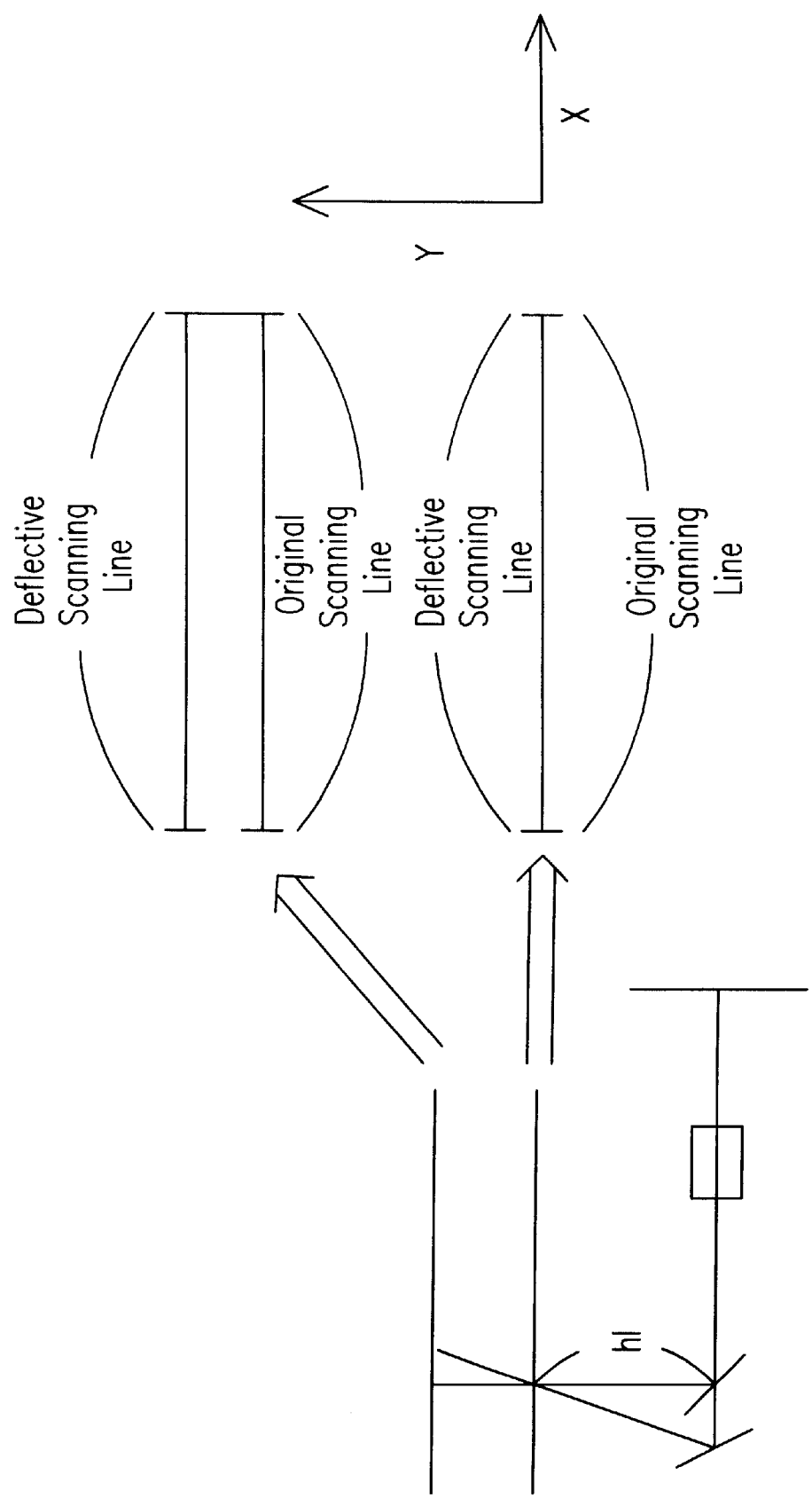

For the deflective conditions as shown in FIG. 2(a) and 2(b), a single point laser source, selected from the three laser emitters 511, 512, 513, and a corresponding calibrating point are enough to perform the calibrating function. For the deflective condition, shown in FIG. 2(c), it is necessary to use three point laser light sources 511, 512, 513 and the first calibrating plate 53 in order to achieve a calibrating function. For the deflective condition as shown in FIG. 2(d), a single point laser light source, the first calibrating plate 53, and the second calibrating plate 54 are required in order to achieve a calibrating function.

Thus, to perform a calibrating function by the apparatus according to the present invention can effectively correct all the possible deflection. Besides, the observation of the calibration is performed from the end of placing the document to be scanned according to the present invention, and the shortcoming in a lower accuracy resulting from observing the calibration from the location of a CCD according to the prior method can be improved.

To conserve the cost of hardware, the amount of the laser light emitters 511, 512, 513 can be reduced to two. Two point light sources are installed on two specific positions respectively, over which an image sensing device of the image scanning apparatus is to travel or to which the light paths of the image scanning apparatus are to extend. Four projective points are obtained on the first calibrating plate 53 and the second calibrating plate 54, respectively. By letting a third projective point to be aligned with the two projective points, the third projective point can be obtained on the first calibrating plate 53 by an extrapolation or interpolation from the two projective points on the first calibrating plate 53 so as to develop a first set of three projective points. Another third projective point on the second calibrating plate 54 can also be obtained by a similar method to develop a second set of three projective points. By adjusting the angle and position of each reflective lens of the reflective lens set for matching each of the projective points with a corresponding one of the calibrating points 531, 532, 533, 534, 535, 536, a calibrating function for the reflective lens set is achieved.

Certainly, the number of the laser light emitters 511, 512, 513 can be reduced to one. A movable point light source can be located at three lined-up positions alternately, over which an image sensing device of the image scanning apparatus is to travel or to which the light paths of the image scanning apparatus are to extend, for alternately emitting a point light beam from each of said three lined-up positions to obtain six projective points on the first calibrating plate 53 and the second calibrating plate 54, respectively. By adjusting the angle and position of each reflective lens of the reflective lens set for matching each of the projective points with a corresponding one of the calibrating points 531, 532, 533, 534, 535, 536, we achieve a calibrating function for the reflective lens set.

From the above-mentioned description, the present invention provides a technical method for performing an observation of the calibration from the end of placing a document to be scanned to increase accuracy for a magnified image being observed at the end of placing a document to be scanned. Besides, the present invention uses two calibrating plates to perform the calibration and is able to find out the errors that are unable to be discovered by the prior method. Thus, the present invention can thoroughly improve the shortcoming occurred in the prior method so as to achieve a calibrating function.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An apparatus adapted to be used in manufacturing an image scanning apparatus for calibrating a reflective lens on a carriage, comprising:

a fixing unit for fixing said carriage;

three point light sources located at three lined-up positions respectively, for respectively emitting point light beams to be transmitted along corresponding one of predetermined light paths of said image scanning apparatus into said carriage and pass out of said carriage from one end of the carriage; and a calibrating device, having, at a first distance from said end of said carriage, a first set of three projective points obtained from said three point light beams passing out of said end of said carriage, and a first set of three calibrating points corresponding to said three point light sources, and having, at a second distance from said end of said carriage, a second set of three projective points obtained from said three point light beams passing out of said end of said carriage, and a second set of three calibrating points corresponding to said three point light sources, for matching each of said projective points on said calibrating device with a corresponding one of said calibrating points by adjusting an angle and a position of said reflective lens on said carriage so as to achieve a calibrating function.

2. The apparatus according to claim 1 wherein, an image sensing device of said image scanning apparatus travels over said three lined-up positions.

3. The apparatus according to claim 1 wherein said light paths of said image scanning apparatus extends to said three lined up positions.

4. The apparatus according to claim 1 wherein said three point light sources are laser light sources.

5. The apparatus according to claim 1 wherein said calibrating device comprises:

a first calibrating plate located at said first distance from said end of said carriage for obtaining thereon said first set of three projective points from said three point light beams passing out of said end of said carriage and having thereon said first set of three calibrating points corresponding to said three point light sources; and a second calibrating plate located at said second distance from said end of said carriage for obtaining thereon said second set of three projective points from said three point light beams passing out of said end of said carriage and having thereon said second set of three calibrating points corresponding to said three point light sources.

6. The apparatus according to claim 5 wherein said first calibrating plate and said second calibrating plate are made of transparent material.

7. The apparatus according to claim 1 wherein said end of said carriage is provided for accommodating an object to be scanned.

8. A method of calibrating a reflective lens on a carriage for being used in manufacturing an image scanning apparatus, comprising the steps of:

fixing said carriage to a specific position;

installing three point light sources on three lined-up positions respectively;

at a first distance from one end of said carriage, defining a first set of three calibrating points with respect to said three point light sources;

at a second distance from said end of said carriage, defining a second set of three calibrating points with respect to said three point light sources;

causing each of said three point light sources to transmit along corresponding one of predetermined light paths of said image scanning apparatus into said carriage and passing out from said end of said carriage so as to obtain a first set of three projective points and a second set of three projective points at the first and the second distance from said end of said carriage respectively; and adjusting an angle and a position of said reflective lens on said carriage for matching each of said projective points with a corresponding one of said calibrating points so as to achieve a calibrating function.

9. The method according to claim 8 wherein said end of said carriage is provided for accomodating an object to be scanned.

10. The method according to claim 8 wherein an image sensing device of said image scanning apparatus travels over said three lined-up positions.

11. The method according to claim 8 wherein said light paths of said image scanning apparatus extends to said three lined-up positions.

12. The method according to claim 8 wherein said first set of three projective points and said first set of three calibrating points are disposed on a first calibrating plate located at said first distance from said end of said carriage.

13. The method according to claim 8 wherein said second set of three projective points and said second set of three calibrating points are disposed on a second calibrating plate located at said second distance from said end of said carriage.

14. An apparatus adapted to be used in manufacturing an image scanning apparatus for calibrating a reflective lens on a carriage, comprising:

a fixing unit for fixing said carriage;

a movable point light source located at three lined-up positions alternately, for alternately emitting a point light beam from each of said three lined-up positions to transmit the point light beam along corresponding one of predetermined light paths of said image scanning apparatus into said carriage and pass out of said carriage from one end of the carriage;

a first calibrating piece, located at a first distance from said end of said carriage, for obtaining thereon a first set of three projective points from said three point light beams passing out of said end of said carriage and having thereon a first set of three calibrating points corresponding to said three point light beams from said three lined-up positions; and a second calibrating piece, located at a second distance from said end of said carriage, for obtaining thereon a second set of three projective points from said three point light beams passing out of said end of said carriage and having thereon a second set of three calibrating points correspond to said three point light beams from said three lined-up positions, and for matching each of said projective points on said calibrating pieces with a corresponding one of said calibrating points by adjusting an angle and a position of said reflective lens on said carriage so as to achieve a calibrating function.

15. The apparatus according to claim 14 wherein an image sensing device of said image scanning apparatus travels over said three lined-up positions.

16. The apparatus according to claim 14 wherein said light paths of said image scanning apparatus extends to said three lined-up positions.

17. The apparatus according to claim 14 wherein said end of said carriage is provided for accomodating an object to be scanned.

18. The apparatus according to claim 14 wherein said point light source is a laser light source.

19. The apparatus according to claim 14 wherein said first calibrating piece is in a form of plate.

20. The apparatus according to claim 14 wherein said second calibrating piece is in a form of plate.

21. The apparatus according to claim 14 wherein said first calibrating piece and said second calibrating piece are made of transparent material.

22. A method of calibrating a reflective lens on a carriage for being used in manufacturing an image scanning apparatus, comprising the steps of:

fixing said carriage to a certain position;

installing a movable point light source on each of three lined-up positions alternately, for alternately emitting three point light beams from said three lined-up positions;

at a first distance from one end of said carriage, defining a first set of three calibrating points with respect to said three point light beams from said three lined-up positions;

at a second distance from said end of said carriage, defining a second set of three calibrating points with respect to said three point light beams from said three lined-up positions;

causing each of said point light beams to transmit along corresponding one of predetermined light paths of said image scanning apparatus into said carriage and pass out from said end of said carriage so as to obtain a first set of three protective points and a second set of three projective points at said first and second distance from said end of said carriage; and adjusting an angle and a position of said reflective lens on said carriage for matching each of said projective points with a corresponding one of said calibrating points so as to achieve a calibrating function.

23. The method according to claim 22 wherein an image sensing device of said scanning apparatus travels over said three lined-up positions.

24. The method according to claim 22 wherein said light paths of said image scanning apparatus extends to said three lined-up positions.

25. The method according to claim 22 wherein said end of said carriage is provided for accomodating an object to be scanned.

26. An apparatus adapted to be used in manufacturing an image scanning apparatus for calibrating a reflective lens, wherein said image scanning apparatus includes said reflective lens and a mirror arranged inside a carriage, said apparatus comprising:

a fixing unit for fixing said carriage;

a point light source located at a position for emitting point light beam to be transmitted along a predetermined light path of said image scanning apparatus into said carriage and pass out of said carriage from one end of the carriage; and a calibrating device having, at a first distance from said end of said carriage, a first projective point from said point light beam passing out of said end of said carriage and a first calibrating point corresponding to said point light source, and having, at a second distance from said end of said carriage, a second projective point from said point light beam passing out of said end of said carriage and a second calibrating point corresponding to said point light source, for matching each of said projective points on said calibrating device with a corresponding one of said calibrating points by adjusting an angle and a position of said reflective lens on said carriage so as to achieve a calibrating function, wherein said calibrating device comprises:

a first calibrating plate located at said first distance from said end of said carriage for obtaining thereon said first projective point from said light beam passing out of said end of said carriage, and having thereon said first calibrating point corresponding to said point light source; and a second calibrating plate located at said second distance from said end of said carriage for obtaining thereon said second projective point from said light beam passing out of said end of said carriage, and having thereon said second calibrating point corresponding to said light source.

27. The apparatus according to claim 26 wherein said point light source is a laser light source.

28. An apparatus adapted to be used in manufacturing an image scanning apparatus for calibrating a reflective lens on a carriage, comprising:

a fixing unit for fixing said carriage;

two point light sources located at two specific positions respectively, for respectively emitting point light beams to be transmitted along corresponding one of predetermined light paths of said image scanning apparatus into said carriage and pass out of said carriage from one end of said carriage;

a first calibrating piece located at a first distance from said end of said carriage for obtaining thereon a first set of two projective points from said two point light beams passing out of said end of said carriage, wherein a third projective point lined up with said first set of two projective points is obtained by operating said first set of two projective points to develop a first set of three projective points, and for defining a first set of three calibrating points on said first calibrating piece to be compared to said first set of three projective points; and a second calibrating piece located at a second distance from said end of said carriage for obtaining thereon a second set of two projective points from said two point light beams passing out of said end of said carriage, wherein another third projective point lined up with said second set of two projective points is obtained by operating said second set of two projective points to develop a second set of three projective points, and for defining a second set of thee calibrating points on said second calibrating piece to be compared to said second set of three projective points, for matching each of said projective points on said calibrating pieces with a corresponding one of said calibrating points by adjusting an angle and a position of said reflective lens on said carriage so as to achieve a calibrating function.

29. The apparatus according to claim 28 wherein an image sensing device of said scanning apparatus travels over said two specific positions.

30. The apparatus according to claim 28 wherein said light paths of said image scanning apparatus extends to said two specific positions.

31. The apparatus according to claim 28 wherein said end of said carriage is provided for accommodating an object to be scanned.

32. The apparatus according to claim 28 wherein said third projective point of said first set of three projective points is obtained by an extrapolation.

33. The apparatus according to claim 28 wherein said third projective point of said first set of three projective points is obtained by an interpolation.

34. The apparatus according to claim 28 wherein said another third projective point of said second set of three projective points is obtained by an extrapolation.

35. The apparatus according to claim 28 wherein said another third projective point of said second set of three projective points is obtained by an interpolation.

36. A method of calibrating a reflective lens on a carriage for being used in manufacturing an image scanning apparatus, comprising the steps of:

fixing said carriage to a certain position;

installing two point light sources on two specific positions respectively;

causing each of said two point light sources to transmit along corresponding one of predetermined light paths of said image scanning apparatus into said carriage and pass out from one end of said carriage so as to obtain a first set of two projective points at a first distance from said end of said carriage and a second set of two projective points at a second distance from said end of said carriage;

obtaining a third projective point lined up with said first set of two projective points by operating said first set of two projective points to develop a first set of three projective points;

defining a first set of three calibrating points to be compared to said first set of three projective points;

obtaining another third projective point lined up with said second set of two projective points by operating said second set of two projective points to develop a second set of three projective points;

defining a second set of three calibrating points to be compared to said second set of three projective points; and adjusting an angle and a position of said reflective lens on said carriage for matching each of said projective points with a corresponding one of said calibrating points so as to achieve a calibrating function.

37. The method according to claim 36 wherein an image sensing device of said image scanning apparatus travels over said two specific positions.

38. The method according to claim 36 wherein said light paths of said image scanning apparatus extends to said two specific positions.

39. The method according to claim 36 wherein said end of said carriage is provided for accommodating an object to be scanned.

40. The method according to claim 36 wherein said third projective point of said first set of three projective points is obtained by an extrapolation.

41. The method according to claim 36 wherein said third projective point of said first set of three projective points is obtained by an interpolation.

42. The method according to claim 36 wherein said another third projective point of said second set of three projective points is obtained by an extrapolation.

43. The method according to claim 36 wherein said another third projective point of said second set of three projective points is obtained by an interpolation.

* * * * *